United States Patent
McKee et al.

(10) Patent No.: US 6,272,482 B1
(45) Date of Patent: Aug. 7, 2001

(54) MANAGING BUSINESS RULES USING JURISDICTIONS

(75) Inventors: Barbara Jane Alspach McKee, Austin; David Lars Ehnebuske, Georgetown, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/134,341

(22) Filed: Aug. 14, 1998

(51) Int. Cl.[7] ............................. G06F 17/00; G06F 17/60
(52) U.S. Cl. .................................... 706/47; 705/7
(58) Field of Search .................. 706/47; 705/7

(56) References Cited

U.S. PATENT DOCUMENTS 5,819,249 * 10/1998 DoHanich et al. .
6,041,041 * 3/2000 Ramanathan et al. .
6,081,832 * 6/2000 Gilchrist et al. .

OTHER PUBLICATIONS

Ehnebuske et al., "Business ObjectS and Business Rules", Business Object Workshop III, Oct. 1997.*
Anderson et al, "Use Case and Business Rules: Styles of Documenting Business Rules in Use Cases", ACM SIG-PLAN Conference, Oct. 1997.*
Rosca et al, "A Decision Making Methodology in Support of the Business Rules Life Cycle", IEEE Proceedings of the 3rd International Symposium on Requirements Engineering, Jan. 1997.*
Ehnebuske et al, "Business Objects and Business Rules", OOPSLA's 97, Business Object Workshop III htp://jeffsutherland.org/oopsla97/index.html, Oct. 1997.*
Anderson et al, "Use Case and Business Rules Styles of Documenting Business Rules in Use Cases", ACM conference on object Oriented programming Systems Languages and Applications, Oct. 1997.*

* cited by examiner

*Primary Examiner*—George B. Davis
(74) *Attorney, Agent, or Firm*—David A. Mims, Jr.; Bracewell & Patterson, L.L.P.

(57) ABSTRACT

A method of managing a set of rules used by a computer program, by defining jurisdictions adapted to exert authority over a decision to be made by the program, creating at least one control point for the decision, and mapping rules from the jurisdictions to the control point. Multiple control points may be created for a given decision, with different sets of rules being mapped to the respective control points. The business management system of the present invention preferably allows jurisdictions to assert exclusivity over decisions, and assigns different priority values to each jurisdiction for a given control point. Management of the rules is simplified by allowing quick identification of a subset of rules from the jurisdictions that apply to a given control point, and by further allowing identification of one or more rules in the subset of the rules that are affected by a change pertaining to the control point.

15 Claims, 5 Drawing Sheets

MANAGING BUSINESS RULES USING JURISDICTIONS

BACKGROUND OF THE INVENTION

1. Field of the Invention

The present invention generally relates to expert computer systems, and more particularly to an improved method of managing an expert business system that relies on a large number of business rules, which method facilitates an understanding of the interactions of the business rules, and simplifies revision of the rules as required by changes in business procedures and policies.

2. Description of Related Art

Businesses use a wide variety of computer hardware and software products, for many different purposes. The hardware of a typical business information system includes a multitude of interconnected computers, printers, scanners, communications equipment, and other peripheral devices, allowing the business to automate much of the processing of its business information. The computers may be of different types, such as mainframes, minicomputers, or network servers supporting client workstations (personal computers, or PCs), or some combination of the foregoing. Business software includes (without limitation) accounting, word processing, database management, communications, publishing, and multimedia presentation software, as well as payroll, financial planning, project management, decision and support, personnel records, and office management software and further including specific business applications such as insurance claims and losses, credit approval, order entry and inventory, etc. All of these programs can run on a variety of platforms, including different operating systems. Businesses often have an Information Services or Information Technology (IT) department which is responsible for the overall management, support and planning of the company's information system needs.

Many businesses have found that as they undergo changes, their IT departments have been unable to keep up with the needed support of their business applications. The changes may be a result of market forces, governmental regulation, or policy switches within the company. This problem is further exacerbated by the swift pace of innovation in the computer industry. Some businesses and their IT departments are addressing this problem by gradually re-working their applications to externalize the variability in these systems into "business rules." The idea is to have business rules automatically implement the established procedures of a company. Business rules might be used to assist in various business decisions, such as whether to increase (or decrease) staffing, how many resources to allocate to a particular project, or when to introduce a new product to the market. The ultimate goal of these systems is to allow business domain experts, not programmers, to change the way the system works, as the needs of a business change. One approach to doing this is to utilize object-oriented expert systems.

Object-oriented systems are developed using object-oriented programming languages in which each variable, function, etc., can be considered an object of a particular "class," having particular attributes. C++ and Java are examples of object-oriented programming languages, and provide advanced programming features such as polymorphism, encapsulation, and inheritance. An object-oriented application that makes decisions or solves problems by using analytical rules, is often referred to as an expert system. In this context, a rule is a logical statement that can be used to verify a supposition, and can further be used (e.g., by way of syllogism) to reach a conclusion. Each rule conforms to the properties of the class associated with rule objects. Expert, rule-based systems typically use two components, a knowledge base and an inference engine, to make a decision. Expert systems that deal with business applications use business rules.

Many older business applications contain rudimentary business rules inherent in the program control logic. However, since these applications cannot adjust to the dynamically changing business conditions, the flexibility of such business rules is severely limited. More recently, an alternative approach has been formulated, which allows developers to create modular business rules, and allows business experts to specify rule parameters using a high-level business rules language. Another approach is to use object-oriented systems to encapsulate the "rules" using a strategy pattern (or method template) from a pattern book. This approach is not dynamic and requires code changes to implement.

Whichever approach is taken, as more applications are converted into rules-driven systems, the number of business rules known to the system rapidly expands, and can become incredibly complicated. The number of the rules can become so large, and their nature so intertwined, that the business domain expert who is responsible for administering the rules becomes unable to accurately reason about how the rules come into play and interact with one another, and unable to predict the complete outcomes and/or side effects of a rule change, particularly if competing rules might mandate different outcomes based on a single set of facts.

In light of the foregoing, it would be desirable to devise a method and system which provides an increased understanding of which business rules apply to various control parameters, and how these identified rules interact to produce a desired result. It would be further advantageous if the method were to allow the business domain expert seeking to make a change to the system, to reduce the effective size of the rule space for a given context.

SUMMARY OF THE INVENTION

It is therefore one object of the present invention to provide an improved method of managing an information system.

It is another object of the present invention to provide such a method that relies on an object-oriented, rules-based system.

It is yet another object of the present invention to provide a method and system for managing business rules, which facilitates an understanding of the interactions of business rules, and simplifies revision of the rules as required by changes in business procedures and policies.

The foregoing objects are achieved in a method of managing a set of rules used by an application program running on a data processing system, generally comprising the steps of defining a plurality of jurisdictions adapted to exert authority over a decision of the application program, creating at least one control point for the decision, and mapping rules from the jurisdictions to the control point. Multiple control points may be created for a given decision, and the mapping step maps different sets of rules to the respective control points. The mapping step may map rules to a given control point from a number of the jurisdictions which is less than the entire number of jurisdictions, i.e., it is possible that not all jurisdictions have rules mapped to a particular control point. A business management system constructed in accordance with the present invention may allow one of the jurisdictions to assert exclusivity over the decision, and may also assign different priority values to each jurisdiction, for a given control point. Management of the rules is simplified by allowing quick identification of a subset of rules from the jurisdictions that apply to a given control point, and by further allowing identification of one or more rules in the subset of the rules that are affected by a change pertaining to the control point.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
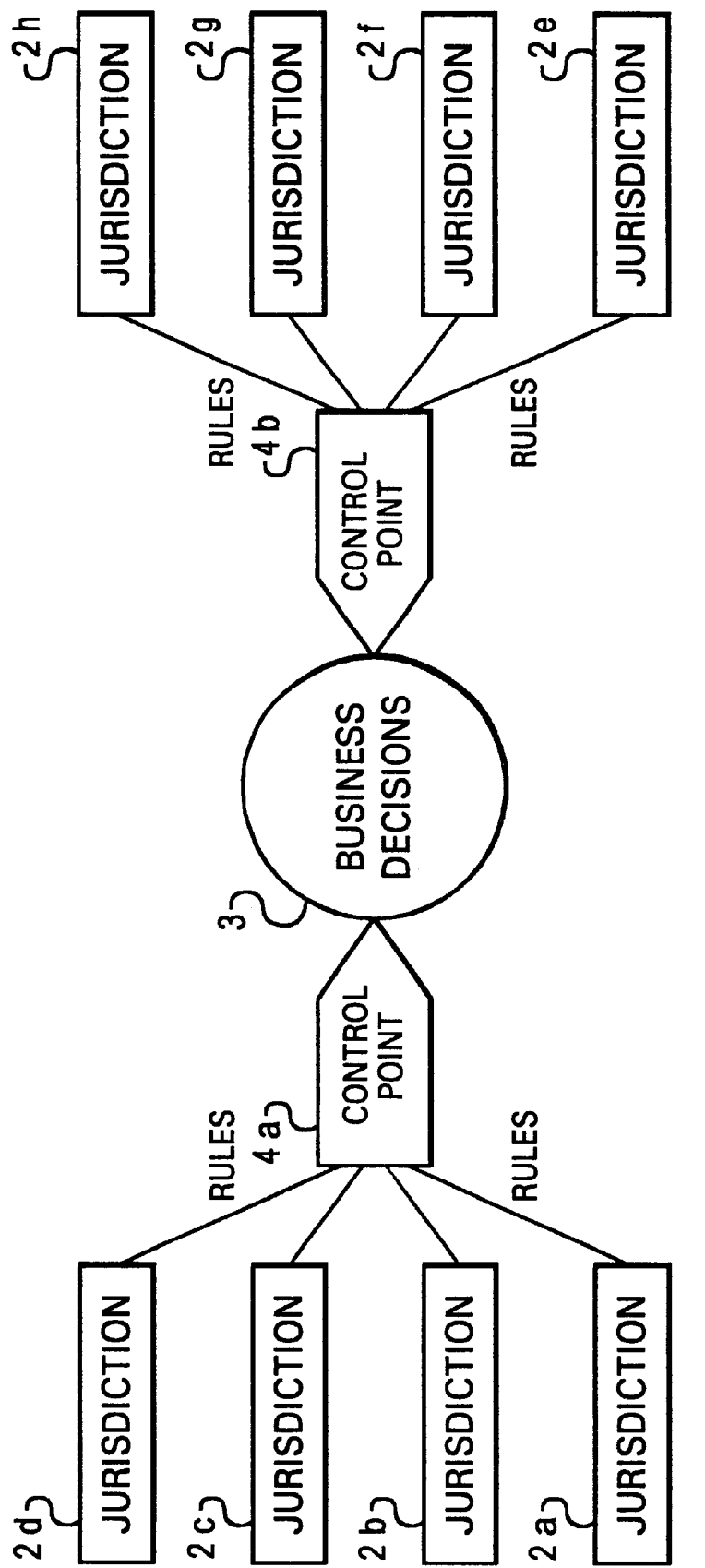
FIG. 1 is a high-level schematic diagram illustrating a generic embodiment of a business rules management system constructed in accordance with the present invention, in which a plurality of jurisdictions having business rules act upon one or more business decisions via control points.

With reference now to the figures, and in particular with reference to FIG. 1, there is depicted one embodiment of a business rules management system 1 constructed in accordance with the present invention, which manages business rules used by an application program running on a data processing system. The present invention introduces the concept of jurisdictional authority as a means of subsetting a large set of business rules. A plurality of jurisdictions 2a–2h have various rules mapped to control points of one or more business decisions 3. In FIG. 1, only two control points 4a, 4b are shown. A control point is a pre-configured trigger point in the semantic model of an object. Control points represent the launching points for business decisions that have been externalized into business rules. As discussed below, this approach results in increased understanding of which rules apply at a particular control point, and how these identified rules interact to produce a desired result.

A "jurisdiction" is any authority who wishes to assert control over a set of business decisions. A jurisdiction can represent a company, a legal entity (such as a state), a line of business (such as property insurance or automobile insurance), or even a team, office, workgroup or department within a business. The behavior of a jurisdiction includes at least two basic abilities. First, a jurisdiction has the ability to determine whether it wishes to assert control over a particular object (that is, apply one or more rules to the object). At various times during the processing of an application, jurisdictions may be interrogated to inquire if they have any business rules that they wish to apply to an object. The jurisdiction decides this through inspection of the object. If the jurisdiction answers affirmatively, the system will subsequently request the set of applicable rules relevant to the particular business decision.

The second basic ability of a jurisdiction involves the management of its collection of business rules. The jurisdiction is responsible for deciding which rules apply at various points in time, what control points they are tied to, and when (or whether) to assert exclusivity.

Jurisdictions are generally independent of one another. However, because there can be more than one jurisdiction asserting control over any single business decision, the jurisdictions are preferably sequenced in some precedence order or priority defined by the business. This priority allows a jurisdiction's decisions to be reviewed by a higher authority. A jurisdiction may also assert exclusivity, thereby excluding lower priority jurisdictions from the decision process.

Figure 2:
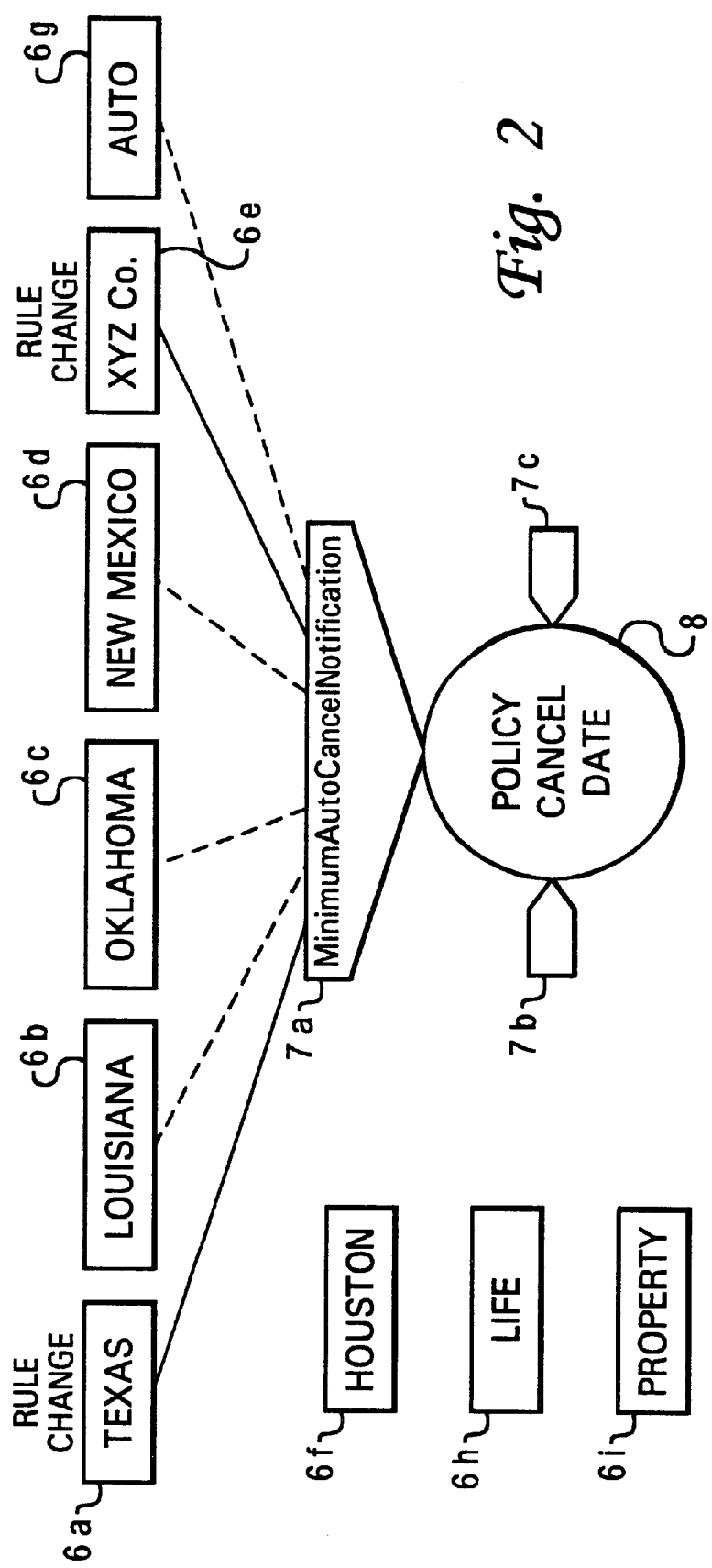
FIG. 2 is a high-level schematic diagram similar to FIG. 1, but depicting a specific example directed to the insurance business.

The further example of FIG. 2 illustrates how jurisdictions can help make a set of business rules easier to consider. XYZ Company is an insurance company which issues home, auto, and life insurance policies, and does business in Texas, Louisiana, Oklahoma, and New Mexico. Texas, Louisiana, Oklahoma, and New Mexico are each represented by jurisdictional authorities 6a–6d, respectively, which hold rules mapping to the state laws for, e.g., auto liability limits, allowable auto deductibles, auto cancellation and renewal notification requirements, property mandatory coverages, property deductible and liability limits, etc. Each jurisdiction contains the set of governing business rules representing each and every regulation involving auto insurance, property insurance, and life insurance.

XYZ Company has some rules of its own that it wishes to assert. For example, it wants to make sure there is ample notification sent out when an auto policy is going to be cancelled. Accordingly, it has a business rule that adds 15 days to whatever period would otherwise be the minimum time for notification of auto policy cancellation (i.e., the minimum time required by the insured's jurisdiction/state). XYZ Company may have other rules of its own, such as a rule restricting the number of vehicles that can be carried on an auto insurance policy, or a rule that limits the number of beneficiaries that can be named on a life insurance policy. XYZ Company is thus represented by another jurisdiction 6e.

In this example, employees that handle policies from the company's Houston office have set up their own jurisdictional authority 6f. They are trying some new operational procedures to see if fraud detection can be expedited. This jurisdiction accordingly has just one business rule which alerts them if an inquiry was made regarding life insurance benefits within one day of an insured's death.

Each line of business (auto, life, and property) is also represented by jurisdictions 6g, 6h, and 6i.

To continue this example, the state of Texas passes a regulation increasing the minimum number of days required to contact a customer about an auto policy cancellation, from 30 days to 45 days. The business user must determine which rule(s) to change. Rules pertaining to life and property insurance (jurisdictions 6h and 6i) can be ignored. The business domain expert can be made aware of this by examining rules known to jurisdictions through the "MinimumAutoCancelNotification" control point 7a. This control point is one of possibly several control points used in making the business decision 8 of when to cancel an insured's policy (other control points are indicated at 7b and 7c, but mappings of rules to those control points are omitted to simplify the drawing). Rules from jurisdictions 6h and 6i pertaining to life and property insurance are thus dropped from consideration, as are all of the rules from the Houston team 6f (and any auto rules not pertaining to "MinimumAutoCancelNotification" control point 7a). At this point in the analysis, the remaining rules left in consideration are those assigned to "MinimumAutoCancelNotification" control point 7a from Texas, Louisiana, Oklahoma, New Mexico, and XYZ Company jurisdictions 6a–6e.

As noted above, jurisdictions are assigned priority values. XYZ Company jurisdiction 6e has a higher priority than the state jurisdictions (which in turn carry a higher priority than Houston jurisdiction 6f). The state jurisdictions are of equal priority. Because only the Texas regulation has changed, the business domain expert can drop from consideration any minimum notification rules from Oklahoma, Louisiana, and New Mexico. Thus, by assigning business rules to jurisdictional authorities, and having these jurisdictions manage rules through known control points, the business domain expert seeking to make a change to the business information system is able to drastically reduce the size of the rule space given the context. In this example, only the minimum notification rules from the state of Texas and the ABC Company are left to reason about, change, and make predictions on outcome.

Figure 3:
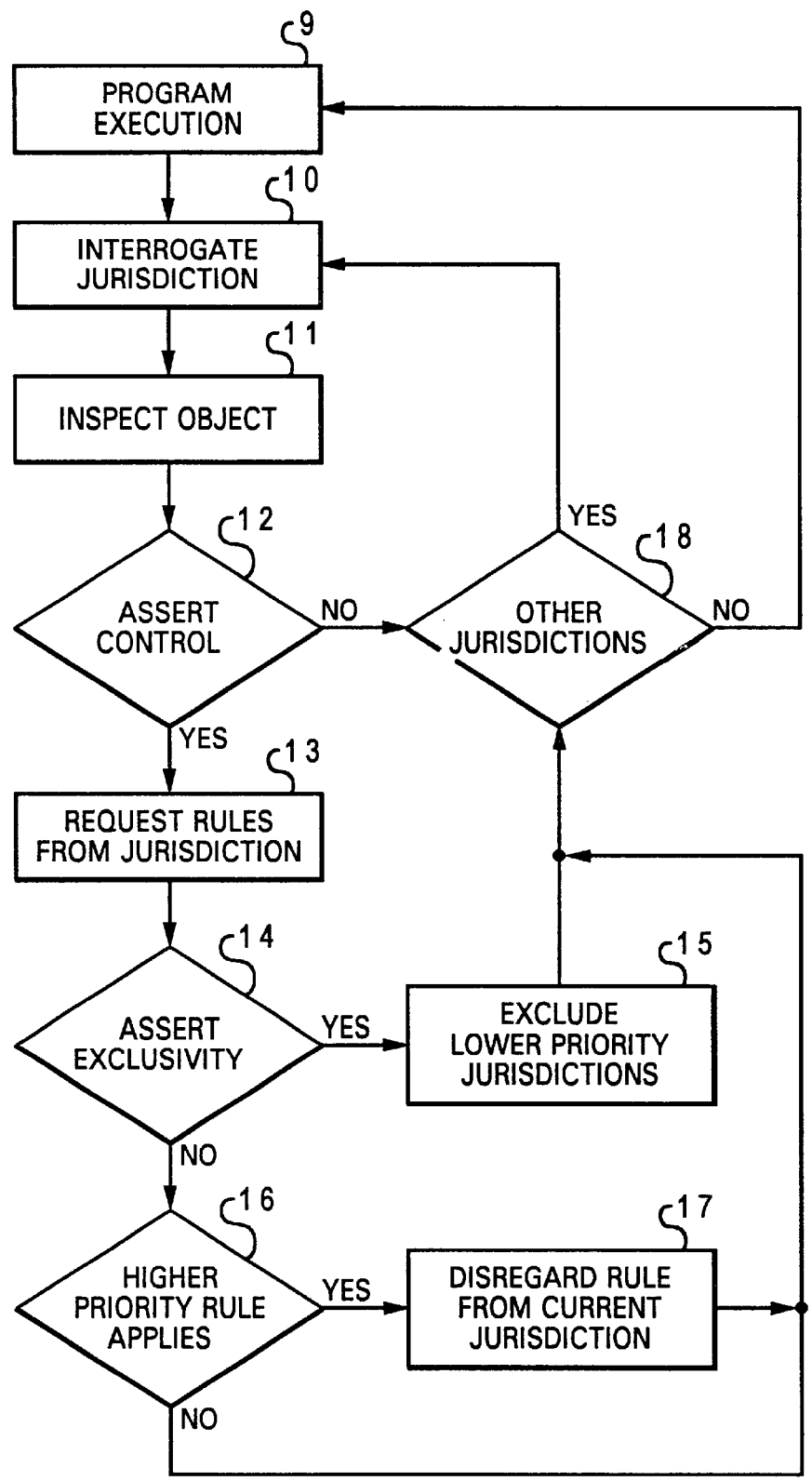
FIG. 3 is a chart depicting logic flow in carrying out rule management for the systems of FIGS. 1 and 2.

The present invention may be further understood with reference to the flow chart of FIG. 3. The process begins with execution of an application program (9), which interrogates a jurisdiction upon detecting a control point (10). The jurisdiction is interrogated to determine whether it desires to assert control over the business decision represented by the control point. The jurisdiction determines its interest by inspecting the object (11). If the jurisdiction determines that it has rules to apply (12), then the system requests those rules (13). The jurisdiction also alerts the system as to whether the jurisdiction is to assert exclusivity (14) and, if so, excludes lower priority jurisdictions from the decision process (15). If the jurisdiction does not assert exclusivity, then the system examines the priority of the relevant rule for that jurisdiction, in relation to other jurisdictions which have been interrogated for the control point (16). If a higher priority rule applies, then any rule from the current jurisdiction is disregarded (17). This process is repeated for each jurisdiction affected by the control point (18). After all relevant rules have been identified, program execution continues.

Figure 4:
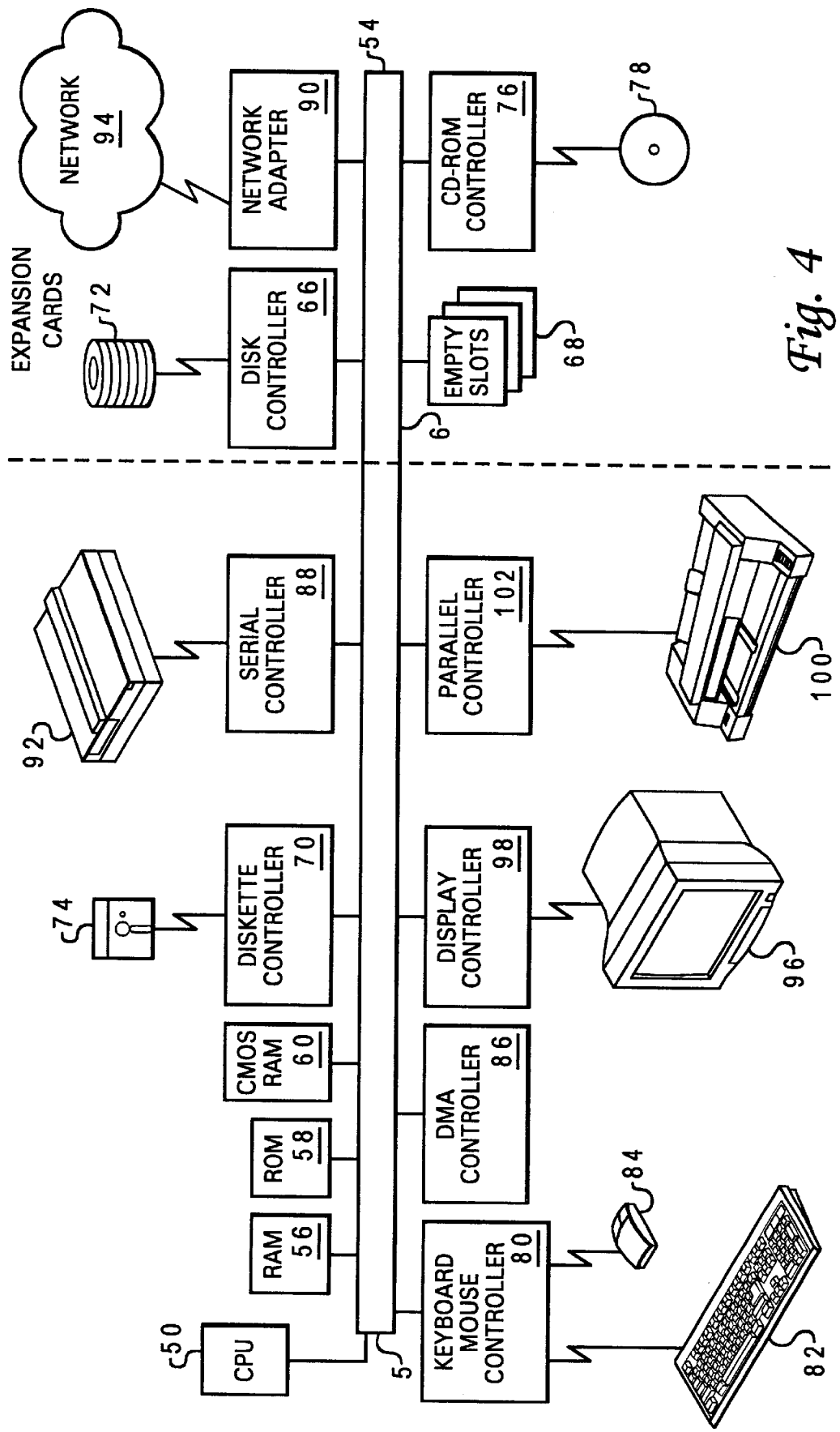
FIG. 4 is a perspective view of one embodiment of a data processing system in which the present invention can be practiced.

With further reference to FIG. 4, a data processing system 20 is shown in which the present invention can be practiced. The data processing system 20 includes processor 22, keyboard 82, and display 96. Keyboard 82 is coupled to processor 22 by a cable 28. Display 96 includes display screen 30, which may be implemented using a cathode ray tube (CRT), a liquid crystal display (LCD), an electrode luminescent panel or the like. The data processing system 20 also includes pointing device 84, which may be implemented using a track ball, a joy stick, touch sensitive tablet or screen, track path, or as illustrated a mouse. The pointing device 84 may be used to move a pointer or cursor on display screen 30. Display screen 30 may depict a graphical user interface (GUI) which allows the user to manage business rules using system 1. Processor 22 may also be coupled to one or more peripheral devices such a modem 92, CD-ROM 78, network adapter 90, and floppy disk drive 40, each of which may be internal or external to the enclosure or processor 22. An output device such as a printer 100 may also be coupled with processor 22.

It should be noted and recognized by those persons of ordinary skill in the art that display 96, keyboard 82, and pointing device 84 may each be implemented using any one of several known off-the-shelf components.

Figure 5:
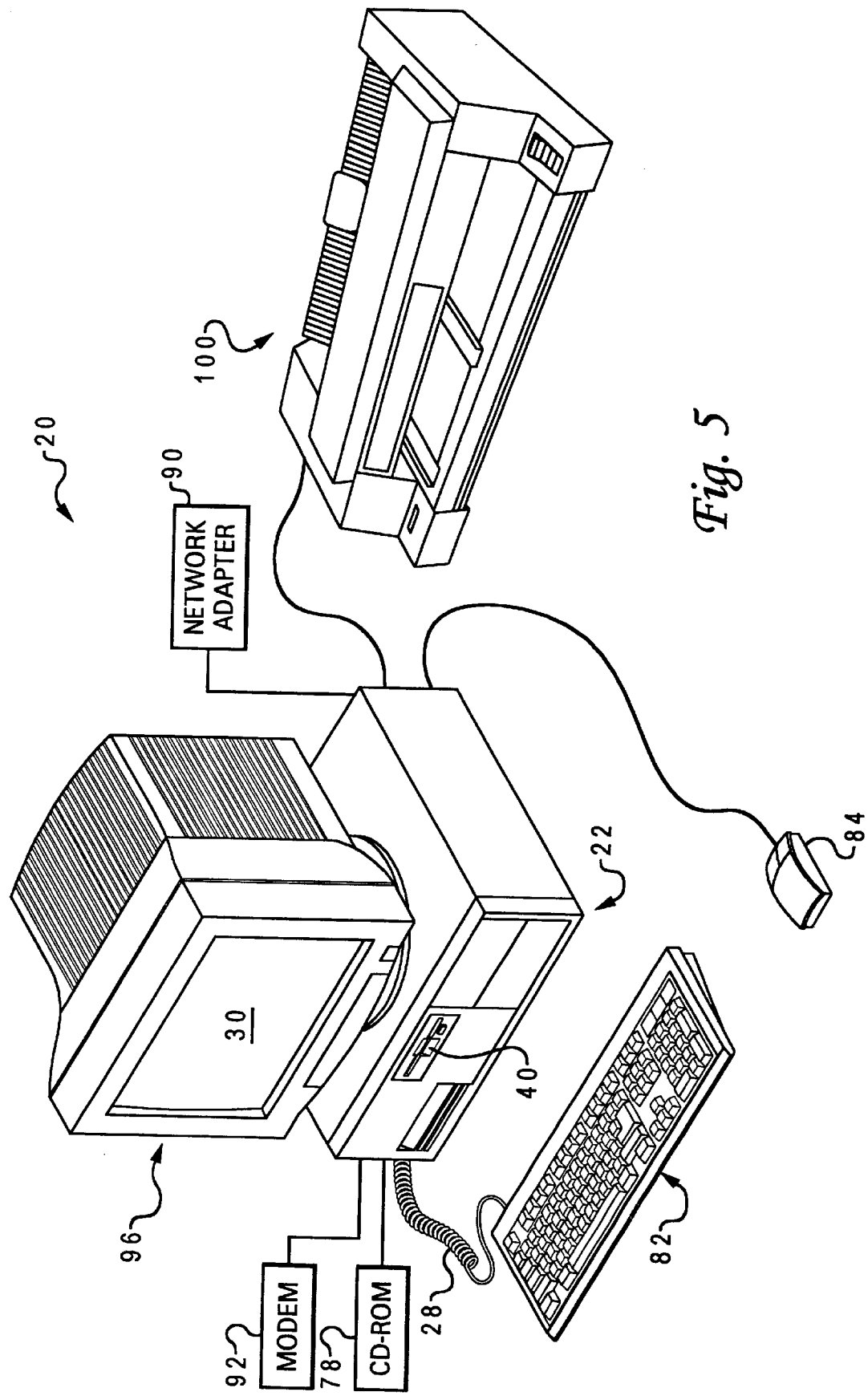
FIG. 5 is a high-level block diagram illustrating selected components that can be included in the data processing system of FIG. 4 according to the teachings of the present invention.

Reference now being made to FIG. 5, a high level block diagram is shown illustrating selected components that can be included in the data processing system 20 of FIG. 4 according to the teachings of the present invention. The data processing system 20 is controlled primarily by computer readable instructions, which can be in the form of software, wherever, or by whatever means such software is stored or accessed. Such software may be executed within the Central Processing Unit (CPU) 50 to cause data processing system 20 to do work.

Memory devices coupled to system bus 5 include Random Access Memory (RAM) 56, Read Only Memory (ROM) 58, and nonvolatile memory 60. Such memories include circuitry that allows information to be stored and retrieved. ROMs contain stored data that cannot be modified. Data stored in RAM can be changed by CPU 50 or other hardware devices. Nonvolatile memory is memory that does not lose data when power is removed from it. Nonvolatile memories include ROM, EPROM, flash memory, or battery-pack CMOS RAM. As shown in FIG. 5, such battery-pack CMOS RAM may be used to store configuration information. Any combination of these memory devices may be used to store program instructions which carry out the business rules management system of the present invention.

An expansion card or board is a circuit board that includes chips and other electronic components connected that adds functions or resources to the computer. Typically, expansion cards add memory, disk-drive controllers 66, video support, parallel and serial ports, and internal modems. For lap top, palm top, and other portable computers, expansion cards usually take the form of PC cards, which are credit card-sized devices designed to plug into a slot in the side or back of a computer. An example of such a slot is PCMCIA slot (Personal Computer Memory Card International Association) which defines type I, II and III card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle tasks such as positioning read/write head, mediating between the drive and the CPU 50, and controlling the transfer of information to and from memory. A single disk controller may be able to control more than one disk drive.

CD-ROM controller 76 may be included in data processing 20 for reading data from CD-ROM 78 (compact disk read only memory). Such CD-ROMs use laser optics rather than magnetic means for reading data.

Keyboard mouse controller 80 is provided in data processing system 20 for interfacing with keyboard 82 and pointing device 84. Such pointing devices are typically used to control an on-screen element, such as a graphical pointer or cursor, which may take the form of an arrow having a hot spot that specifies the location of the pointer when the user presses a mouse button. Other pointing devices include a graphics tablet, stylus, light pin, joystick, puck, track ball, track pad, and the pointing device sold under the trademark "Track Point" by International Business Machines Corp. (IBM).

Communication between processing system 20 and other data processing systems may be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such a serial interface may be used to communicate with modem 92. A modem is a communication device that enables a computer to transmit information over standard telephone lines. Modems convert digital computer signals to interlock signals suitable for communications over telephone lines. Modem 92 can be utilized to connect data processing system 20 to an on-line information service or an Internet service provider. Such service providers may offer software that can be down loaded into data processing system 20 via modem 92. Modem 92 may provide a connection to other sources of software, such as a server, an electronic bulletin board (BBS), or the Internet.

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task. Network 94 can also provide a connection to other systems like those mentioned above (a BBS, the Internet, etc.).

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image (or combinations thereof) on paper or on another medium, such as a transparency sheet. Other types of printers may include an image setter, a plotter, or a film recorder.

Parallel controller 102 is used to send multiple data and control bits simultaneously over wires connected between system bus 5 and another parallel communication device, such as a printer 100.

CPU 50 fetches, decodes, and executes instructions, and transfers information to and from other resources via the computers main data-transfer path, system bus 5. Such a bus connects the components in a data processing system 20 and defines the medium for data exchange. System bus 5 connects together and allows for the exchange of data between memory units 56, 58, and 60, CPU 50, and other devices as shown in FIG. 5. Those skilled in the art will appreciate that a data processing system constructed in accordance with the present invention may have multiple components selected from the foregoing, including even multiple processors.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of managing a set of rules used by an application program running on a data processing system, comprising the steps of:

defining a plurality of jurisdictions adapted to exert authority over a decision of the application program;

creating at least one control point for the decision;

mapping rules from the jurisdictions to the control point;

assigning priority values to each jurisdiction; and modifying a decision outcome, by a higher priority jurisdiction, wherein the decision outcome resulted from a lower priority jurisdiction.

2. The method of claim 1 wherein:

said creating step creates at least two control points; and said mapping step maps a first set of rules to a first one of the control point, and maps a second set of rules to a second one of the control points.

3. The method of claim 1 wherein one of the jurisdictions performs the further step of asserting exclusivity over the decision.

4. The method of claim 1 wherein said mapping step maps rules from a number of the jurisdictions which is less than the entire number of jurisdictions.

5. The method of claim 1 comprising the further step of identifying a subset of rules from the jurisdictions that apply to the control point.

6. The method of claim 5 comprising the further step of identifying one or more rules in the subset of the rules that are affected by a change pertaining to the control point.

7. The method of claim 1 comprising the further step of interrogating each of the jurisdictions to determine whether a given jurisdiction desires to assert control over the decision.

8. The method of claim 7 wherein a given jurisdiction inspects the control point in response to said step of interrogating each of the jurisdictions.

9. A rules management system comprising:

memory means for storing data and program instructions;

means for processing data and program instructions; and program means, stored in said memory means, for enabling said means for processing data and program instructions to (i) define a plurality of jurisdictions adapted to exert authority over a decision of an application program running on said means for processing data and program instructions, (ii) create at least one control point for the decision, (iii) map rules from the jurisdictions to the control point, and (iv) assign priority values to each jurisdiction, said program means allowing a higher priority jurisdiction to modify a decision outcome resulting from a lower priority jurisdiction.

10. The rules management system of claim 9 wherein said program means creates at least two control points, and maps a first set of rules to a first one of the control points, and a second set of rules to a second one of the control points.

11. The rules management system of claim 9 wherein said program means further allows a given one of the jurisdictions to assert exclusivity over the decision.

12. The rules management system of claim 9 wherein said program means maps rules from a number of the jurisdictions which less is than the entire number of jurisdictions.

13. The rules management system of claim 9 wherein said program means identifies a subset of rules from the jurisdictions that apply to the control point.

14. The rules management system of claim 13 wherein said program means further identifies one or more rules in the subset of the rules that are affected by a change pertaining to the control point.

15. The rules management system of claim 9 wherein said program means interrogates each of the jurisdictions to determine whether a given jurisdiction desires to assert control over the decision.

* * * * *